United States Patent
Yang et al.

(10) Patent No.: US 9,612,681 B2
(45) Date of Patent: Apr. 4, 2017

(54) 3D DISPLAY APPARATUS AND CONTROL METHOD FOR SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Yingming Liu, Beijing (CN); Weijie Zhao, Beijing (CN); Jingbo Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 14/742,598

(22) Filed: Jun. 17, 2015

(65) Prior Publication Data

US 2016/0195976 A1 Jul. 7, 2016

(51) Int. Cl.
*G06F 3/041* (2006.01)
*G02B 27/22* (2006.01)
(Continued)

(52) U.S. Cl.
CPC ........... *G06F 3/0416* (2013.01); *G02B 27/22* (2013.01); *G02F 1/13338* (2013.01);
(Continued)

(58) Field of Classification Search
None
See application file for complete search history.

(56) References Cited

U.S. PATENT DOCUMENTS

| | | | | |
|---|---|---|---|---|
| 2011/0109622 A1* | 5/2011 | Son | ...... | G02F 1/13338 345/419 |
| 2013/0314624 A1* | 11/2013 | Li | ...... | G06F 3/044 349/12 |
| 2014/0125887 A1* | 5/2014 | Wu | ...... | G02B 27/22 349/12 |

FOREIGN PATENT DOCUMENTS

| CN | 102062965 A | 5/2011 |
|---|---|---|
| CN | 102692748 A | 9/2012 |

(Continued)

OTHER PUBLICATIONS

Office Action in Chinese Application No. 201510004843.3 dated Nov. 30, 2016, with English translation. 10 pages.

*Primary Examiner* — Seokyun Moon
(74) *Attorney, Agent, or Firm* — Blakely Sokoloff Taylor & Zafman LLP

(57) ABSTRACT

The present disclosure discloses a three dimensional (3D) display apparatus and a control method for the 3D display apparatus, the 3D display apparatus comprising: a liquid crystal optical grating located on a liquid crystal display module, wherein the liquid crystal optical grating is provided with a respective probe terminal on each of the four corners of an electrode layer thereof, for detection of an electric current value; and a controller signally connected with the four probe terminals, wherein the controller is used for calculation of a touch point position of a touch object on the 3D display apparatus based on the electric current values detected at the four probe terminals. The 3D display apparatus has both a 3D display function and a touch screen function.

9 Claims, 7 Drawing Sheets

(51) Int. Cl.
*G02F 1/1333* (2006.01)
*H04N 13/00* (2006.01)
*G06T 15/00* (2011.01)

(52) U.S. Cl.
CPC ........... *G06F 3/0412* (2013.01); *H04N 13/00* (2013.01); *G06T 15/00* (2013.01)

(56) References Cited

FOREIGN PATENT DOCUMENTS

| CN | 103309094 A | 9/2013 | |
|---|---|---|---|
| CN | WO 2013163871 A1 * | 11/2013 | ............. G02B 27/22 |
| CN | 103941445 A | 7/2014 | |

* cited by examiner

3D DISPLAY APPARATUS AND CONTROL METHOD FOR SAME

RELATED APPLICATIONS

The present application claims the benefit of Chinese Patent Application No. 201510004843.3, filed Jan. 5, 2015, the entire disclosure of which is incorporated herein by reference.

FIELD OF THE DISCLOSURE

The present disclosure relates to the field of three dimensional (hereinafter referred to as 3D in short) display technologies, and particularly to a 3D display apparatus and control method for same.

BACKGROUND OF THE DISCLOSURE

With the development of the display technology, 3D display products and touch screen products have found increasingly wide use. It is a matter of interest to the industry how to combine a 3D display substrate and a touch screen substrate to obtain a 3D display apparatus with a touch screen function.

Please referring to FIG. 1, at present, the touch screen function of a 3D display apparatus is implemented by directly superimposing a touch screen substrate 20 on a 3D display substrate 10. The 3D display substrate 10 is located on a Liquid Crystal Display Module (LCM) 31, and comprises a lower substrate 11, a upper substrate 12, electrodes 13 located on the lower substrate 11 and the upper substrate 12, respectively, and sealant 14 bonding the lower substrate 11 and the upper substrate 12. The touch screen substrate 20 comprises a glass substrate 21, an outer side substrate 22, electrodes 13 located on the glass substrate 21 and the outer side substrate 22, respectively, and sealant 14 bonding the glass substrate 21 and the outer side substrate 22.

Since the 3D display substrate 10 and the touch screen substrate 20 are of a certain thickness themselves, the thickness of the 3D display apparatus with a touch screen function obtained by directly superimposing the touch screen substrate 20 on the 3D display substrate 10 is at least the sum of the thickness of the 3D display substrate 10 and that of the touch screen substrate 20, thereby resulting in a relatively thick 3D display apparatus.

SUMMARY OF THE DISCLOSURE

In view of the problem that the 3D display apparatus with a touch screen function is relatively thick, it is an object of the present disclosure to provide an improved 3D display apparatus and a control method for the 3D display apparatus.

In a first aspect of the present disclosure, there is provided a three dimensional (3D) display apparatus comprising: a liquid crystal optical grating located on a liquid crystal display module, wherein the liquid crystal optical grating is provided with a respective probe terminal on each of the four corners of an electrode layer thereof, for detection of an electric current value; and a controller signally connected with the four probe terminals, wherein the controller is used for calculation of a touch point position of a touch object on the 3D display apparatus based on the electric current values detected at the four probe terminals.

Further, the liquid crystal optical grating comprises a lower substrate disposed on the liquid crystal display module and an upper substrate disposed oppositely to the lower substrate.

Optionally, the upper substrate is provided with a plurality of upper substrate stripe-shaped electrodes arranged side by side on the surface facing the lower substrate, the four probe terminals located, respectively, at the four corners of the rectangular outline formed by the plurality of upper substrate stripe-shaped electrodes, or the upper substrate is provided with a planar electrode on the surface facing the lower substrate, the four probe terminals located, respectively, at the four corners of the rectangle formed by the planar electrode.

Optionally, the plurality of upper substrate stripe-shaped electrodes consist of two parts, one of which comprising a plurality of a first stripe-shaped electrode connected by a first connection part, the other of which comprising a plurality of a second stripe-shaped electrode connected by a second connection part, the first stripe-shaped electrodes and the second stripe-shaped electrodes being arranged interlaced with each other.

Optionally, the four probe terminals are located at the both ends of the first connection part and the both ends of the second connection part, respectively.

Optionally, the lower substrate is provided with a plurality of lower substrate stripe-shaped electrodes arranged side by side on the surface facing the upper substrate.

Optionally, the plurality of lower substrate stripe-shaped electrodes consist of two parts, one of which comprising a plurality of a third stripe-shaped electrode connected by a third connection part, the other of which comprising a plurality of a fourth stripe-shaped electrode connected by a fourth connection part, the third stripe-shaped electrodes and the fourth stripe-shaped electrodes being arranged interlaced with each other.

Optionally, the plurality of upper substrate stripe-shaped electrodes and the plurality of lower substrate stripe-shaped electrodes are arranged perpendicular to each other.

Optionally, in case the upper substrate is provided with a plurality of upper substrate stripe-shaped electrodes arranged side by side on the surface facing the lower substrate, the lower substrate is provided with a planar electrode on the surface facing the upper substrate.

Optionally, the plurality of lower substrate stripe-shaped electrodes or the planar electrode disposed on the lower substrate is grounded during implementation of a touch screen function of the 3D display apparatus.

Optionally, the plurality of upper substrate stripe-shaped electrodes are arranged obliquely with respect to a side of the upper substrate, and the plurality of lower substrate stripe-shaped electrodes are arranged obliquely with respect to a side of the lower substrate.

With a respective probe terminal disposed on each of the four corners of an electrode layer of the liquid crystal optical grating of the 3D display apparatus, the touch point position can be calculated from the electric current values of the four probe terminals, so as to achieve an integration of a touch screen function into the 3D display apparatus. As compared to the prior art, the 3D display apparatus with a touch screen function according to the present disclosure has a substantially reduced thickness.

In a second aspect of the present disclosure, there is provided a control method for the 3D display apparatus as described above in the first aspect, the method comprising: within a first time period of a preset timeframe, grounding the lower substrate electrode of the liquid crystal optical grating and applying a low voltage alternating signal to the upper substrate electrode of the liquid crystal optical grating, so as to implement a touch screen function of the 3D display apparatus; and within a second time period of the preset timeframe, grounding the lower substrate electrode of the liquid crystal optical grating and applying a preset voltage signal to the upper substrate electrode of the liquid crystal optical grating, or grounding the upper substrate electrode of the liquid crystal optical grating and applying the preset voltage signal to the lower substrate electrode of the liquid crystal optical grating, so as to implement a 3D display function of the 3D display apparatus.

Integration of a touch screen function with a 3D display function in two directions is enabled for the 3D display apparatus by implementing the touch screen function within the first time period of the preset timeframe and the 3D display function in a first or second direction within the second time period of the preset timeframe.

BRIEF DESCRIPTION OF THE DRAWINGS

The illustrated drawings are provided here for a further understanding of the disclosure, which forms a part of the disclosure. The exemplary embodiments and the description thereof serve as an explanation of the disclosure, not as a limitation of the disclosure. In the figures.

Figure 1:
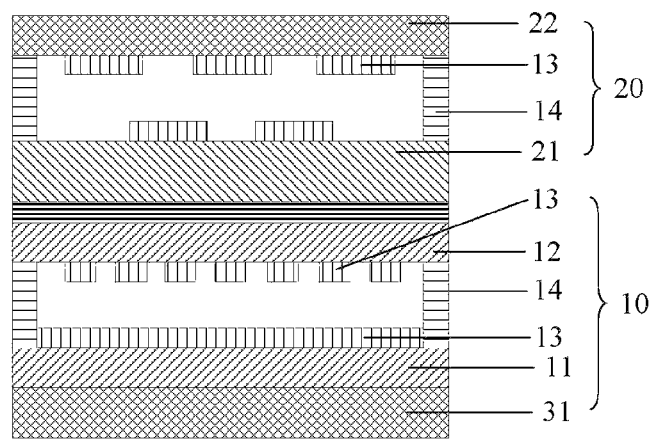
FIG. 1 is a cross-sectional view of a 3D display apparatus in the prior art.

| Reference numerals: | |
|---|---|
| 10-3D display substrate | 20-touch screen substrate |
| 11-lower substrate | 12-upper substrate |
| 13-electrode | 14-sealant |
| 21-glass substrate | 22-outer side substrate |
| 30-3D display apparatus | 31-liquid crystal display module |
| 32-liquid crystal optical grating | 33-electrode |
| 34-probe terminal | 35-lower substrate |
| 36-upper substrate | 37-upper substrate stripe-shaped electrode |
| 41-firest connection part | 42-first stripe-shaped electrode |
| 43-second connection part | 44-second stripe-shaped electrode |
| 45-lower substrate stripe-shaped electrode | |
| 46-third connection part | 47-third stripe-shape electrode |
| 48-fourth connection part | 49-fourth stripe-shaped electrode |

DETAILED DESCRIPTION OF THE DISCLOSURE

The 3D display apparatus and control method for same according to embodiments of the disclosure are further described in detail below with reference to the accompanying drawings.

Figure 2:
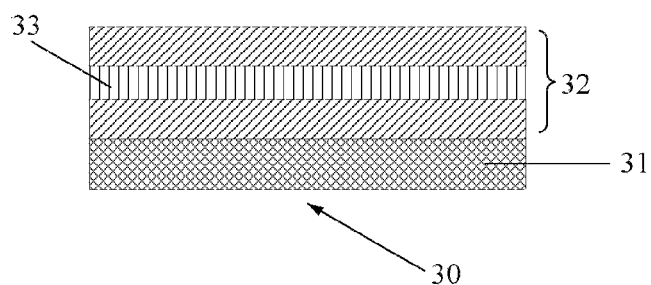
FIG. 2 is a cross-sectional view of a 3D display apparatus according to an embodiment of the present disclosure.
Figure 3:
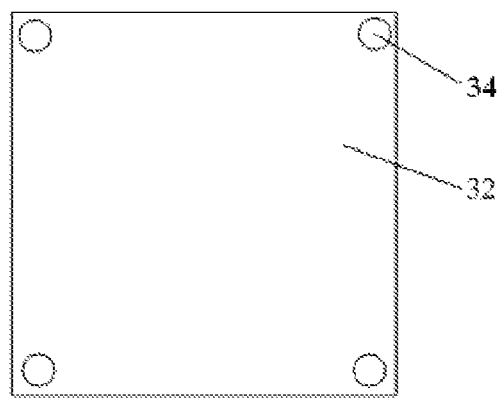
FIG. 3 is a plan view of the electrodes and probe terminals in the liquid crystal grating of the 3D display apparatus as shown in FIG. 2.

Please referring to FIGS. 2 and 3, according to an embodiment of the disclosure, a 3D display apparatus 30 comprises a liquid crystal optical grating 32 that is located on a liquid crystal display module 31, wherein the liquid crystal optical grating 32 is provided with a respective probe terminal 34 on each of the four corners of an electrode layer 33 of the liquid crystal optical grating 32. The 3D display apparatus 30 further comprises a controller (not shown) that is connected with the four probe terminals 34, wherein the controller may be used for calculation of a touch point position of a touch object (e.g. a finger) on the 3D display apparatus 30 based on the electric current values detected at the four probe terminals 34.

The controller calculates the touch point position based on a principle similar to that of a surface capacitive touch screen. Specifically, with a low voltage (high frequency) alternating signal being applied to each of the four probe terminals 34, when a person touches the surface of the liquid crystal optical grating 32 using one of his/her fingers, a coupling capacitor will be formed between the finger and the surface of the liquid crystal optical grating 32, and since this coupling capacitor acts as a conductor for the high frequency alternating signal, a small electric current will be drawn by the finger from the touch point. With an electric current flows from the respective probe terminal 34 on each of the four corners of the liquid crystal optical grating 32 to the touch point, the magnitude of the electric current flowing through the respective terminal is proportional to the distance from the respective one of the four corners to the touch point. Thus, the touch point position can be derived by the controller from an accurate calculation of the proportion among the magnitudes of the electric currents detected at the four terminals. It is to be noted that the low voltage alternating signal is "low" to the extent that it is adapted for the requirements for electric current detection at the probe terminals 34.

In this way, integration of a touch screen function into the 3D display apparatus 30 (specifically, the liquid crystal grating 32) may be achieved. As compared to the prior art shown in FIG. 1, the 3D display apparatus 30 with the touch screen function according to the embodiment of the disclosure may have a thickness of only that of the 3D display substrate 10 per se, which is a significant reduction in thickness.

As is known, a liquid crystal optical grating typically comprises an upper substrate and a lower substrate, the electrodes formed on each of which may be of a number of shapes, such as planar, stripe-shaped, etc. It is desirable to dispose the probe terminals 34 at the electrode layer on the upper substrate to implement the calculation of the touch point position as mentioned above, due to an improved detection accuracy (because in this case, with the finger being closer to the upper substrate of the liquid crystal optical grating during a touch operation, the touch sensing signal is easier to detect), although other implementations are possible, such as disposing the probe terminals 34 at the electrode layer on the lower substrate to perform the calculation of the touch point position.

Figure 4:
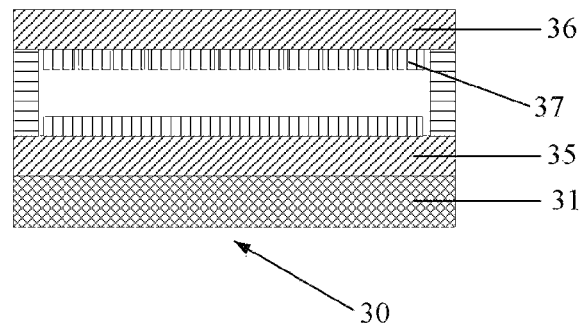
FIG. 4 is a cross-sectional view of the liquid crystal optical grating of the 3D display apparatus as shown in FIG. 2.
Figure 5:
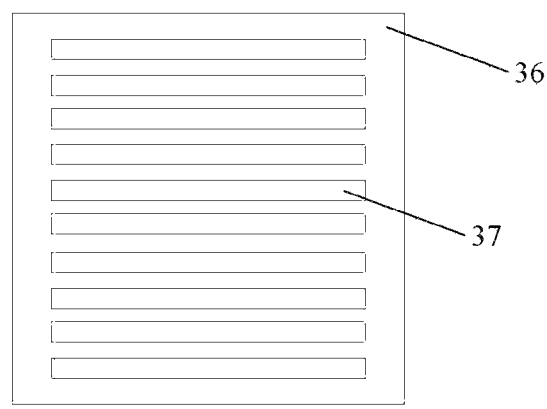
FIG. 5 is a schematic diagram of the upper substrate stripe-shaped electrodes of the liquid crystal grating as shown in FIG. 4.
Figure 6:
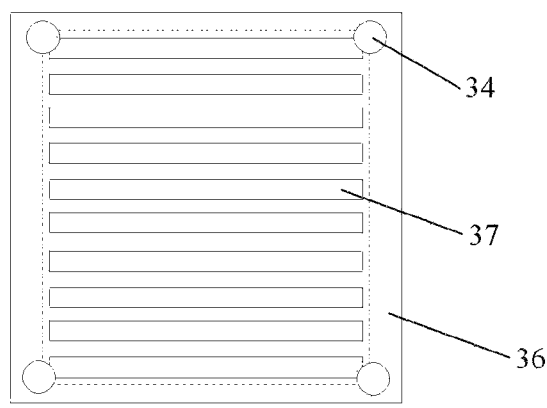
FIG. 6 is a plan view of the upper substrate stripe-shaped electrodes as shown in FIG. 5 with probe terminals.

Please referring to FIGS. 4 and 5, in an implementation, the liquid crystal optical grating 32 may comprise a lower substrate 35 located on the liquid crystal display module 31 and a upper substrate 36 disposed oppositely to the lower substrate 35, wherein the upper substrate 36 is provided with a plurality of upper substrate stripe-shaped electrodes 37 arranged side by side on its surface facing the lower substrate 35. Referring further to FIG. 6, the four probe terminals 34 may be located at the four corners of the rectangular outline (indicated by the dash line) formed by the plurality of upper substrate stripe-shaped electrodes 37, respectively.

Figure 7:
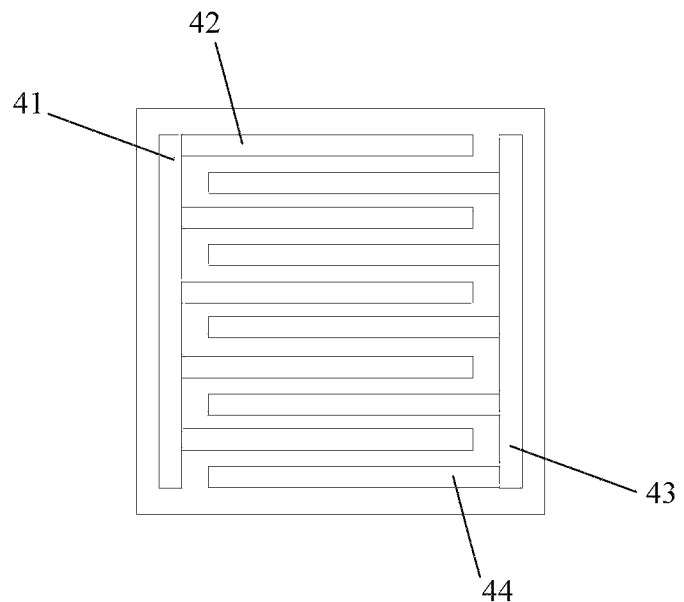
FIG. 7 is a schematic diagram of an arrangement of the upper substrate stripe-shaped electrodes as shown in FIG. 5.

Please referring to FIG. 7, the plurality of upper substrate stripe-shaped electrodes 37 may consist of two parts, one of which being a plurality of a first stripe-shaped electrode 42 that are connected by a first connection part 41, the other of which being a plurality of a second stripe-shaped electrode 44 that are connected by a second connection part 43, the first stripe-shaped electrodes 42 and the second stripe-shaped electrodes 44 being arranged interlaced with each other. Since the first stripe-shaped electrodes 42 and the second stripe-shaped electrodes 44 are interlaced with each other, applying a 3D display driving signal to either of them can implement a slit grating, and hence a 3D display function.

Figure 8:
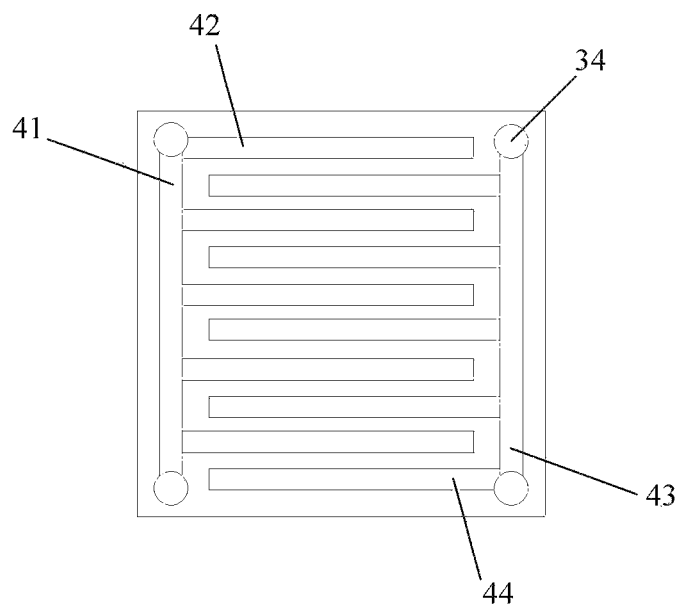
FIG. 8 is a plan view of the arrangement of the upper substrate stripe-shaped electrodes as shown in FIG. 7 with probe terminals.

Referring further to FIG. 8, the four probe terminal 34 may be located at the both ends of the first connection part 41 and the both ends of the second connection part 43, respectively. In this case, in a touch operation, electric currents will flow from each of the four probe terminals 34 to the touch point along the stripe-shaped electrodes 37 (which may comprise the plurality of the first stripe-shaped electrodes 42 connected by the first connection part 41 and the plurality of the second stripe-shaped electrodes 44 connected by the second connection part 43), such that the magnitude of the electric current detected at a respective one of the four terminals is no longer proportional to the distance from the respective terminal to the touch point, but to the length of the stripe-shaped electrodes 37 along which it flows. The stripe-shaped electrodes 37 being arranged regularly on the upper substrate, the length of the stripe-shaped electrode 37 along which an electric current flows from any of the four probe terminals 34 to any point on the upper substrate 36 is known. The touch point position can therefore still be derived by the controller from an accurate calculation of the proportion among the magnitudes of the four electric currents.

In another alternative implementation, a planar electrode may be formed on the surface of the upper substrate 36 that is opposite to the lower substrate 35, and stripe-shaped electrodes similar to the stripe-shaped electrodes 37 may be formed on the surface of the lower substrate 35 that is opposite to the upper substrate 36. The four probe terminals 34 are located at the four corners of the rectangle formed by the planar electrode, respectively.

Optionally, during implementation of the touch screen function, with the low voltage alternating signal being applied to the four probe terminals 34 on the upper substrate 36, the electrodes arranged on the lower substrate 35 may be grounded in order to shield themselves from the interference of the noise signal from the liquid crystal display module 31. Due to a time-division driving (discussed below) of the touch screen function and the 3D display function, the 3D display function will not be impacted by the grounding of the electrodes on the lower substrate during the implementation of the touch screen function.

Figure 9:
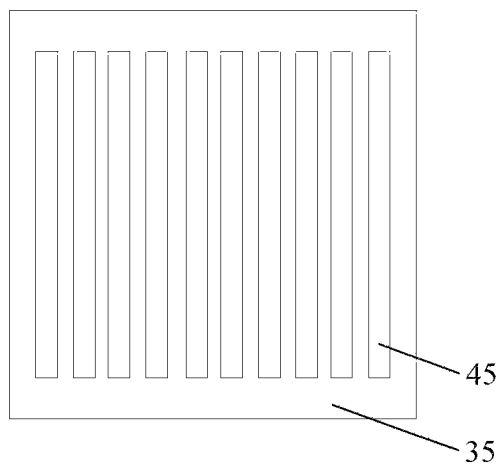
FIG. 9 is a schematic diagram of the lower substrate stripe-shaped electrodes of the liquid crystal grating as shown in FIG. 4.

It is also possible to implement a slit grating on the lower substrate 35 of the liquid crystal optical grating 32, and hence the 3D display function. Please referring to FIG. 9, in an implementation, the lower substrate 35 is provided with a plurality of lower substrate stripe-shaped electrodes 45 arranged side by side on its surface facing the upper substrate 36.

Figure 10:
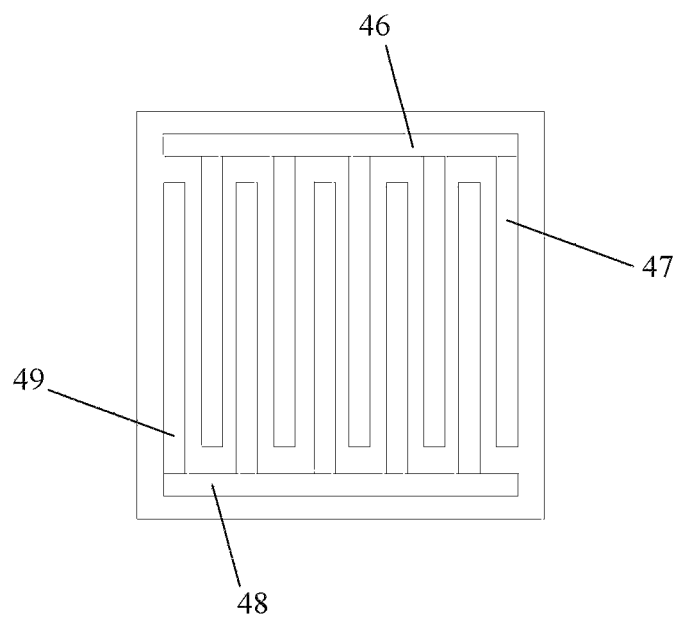
FIG. 10 is a schematic diagram of an arrangement of the lower substrate stripe-shaped electrodes as shown in FIG. 9.

Referring further to FIG. 10, the plurality of lower substrate stripe-shaped electrodes 45 may consist of two parts, one of which being a plurality of a third stripe-shaped electrode 47 that are connected by a third connection part 46, the other of which being a plurality of a fourth stripe-shaped electrode 49 that are connected by a fourth connection part 48, the plurality of the third stripe-shaped electrodes 47 and the plurality of the fourth stripe-shaped electrodes 49 are arranged interlaced with each other. Since the plurality of the third stripe-shaped electrodes 47 and the plurality of the fourth stripe-shaped electrodes 49 are interlaced with each other, applying of a 3D display driving signal to either of them may implement a slit grating, and hence a 3D display function.

In another alternative implementation, a planar electrode may be formed on the surface of the lower substrate 35 that is opposite to the upper substrate 36, and stripe-shaped electrodes similar to the stripe-shaped electrodes 45 may be formed on the surface of the upper substrate 36 that is opposite to the lower substrate 35.

Further, in order for the 3D display apparatus to implement a 3D display in two directions (e.g. in a lateral direction and a longitudinal direction), the stripe-shaped electrodes 37 as shown in FIG. 7 may be used on the upper substrate 36, and the stripe-shaped electrodes 45 as shown in FIG. 10 may be used on the lower substrate 35. The upper substrate stripe-shaped electrodes 37 and the lower substrate stripe-shaped electrodes 45 are arranged perpendicular to each other. The liquid crystal optical grating 32 forms a lateral black-and-white barrier, if the plurality of the third stripe-shaped electrodes 47 connected by the third connection part 46 and the plurality of the fourth stripe-shaped electrodes 49 connected by the fourth connection part 48 are all grounded on the lower substrate 35, and if a preset voltage signal is applied for example to the plurality of the first stripe-shaped electrodes 42 connected by the first connection part 41 on the upper substrate 36, with the plurality of the second stripe-shaped electrodes 44 connected by the second connection part 43 all grounded. The liquid crystal optical grating 32 forms a longitudinal black-and-white barrier, if the plurality of the first stripe-shaped electrodes 42 connected by the first connection part 41 and the plurality of the second stripe-shaped electrodes 44 connected by the second connection part 43 are all grounded on the upper substrate 36, and if the preset voltage signal is applied for example to the plurality of the third stripe-shaped electrodes 47 connected by the third connection part 46 on the lower substrate 35, with the plurality of the fourth stripe-shaped electrodes 49 connected by the fourth connection part 48 all grounded. In this way, a 3D display for the 3D display apparatus is implemented in two directions (i.e. in a lateral direction and a longitudinal direction).

It is to be noted that the liquid crystal optical grating 32 is not limited to forming the lateral black-and-white barrier in the above-mentioned manner. For example, the preset voltage signal may be applied to the plurality of the second stripe-shaped electrodes 44 connected by the second connection part 43 on the upper substrate 36, with the plurality of the first stripe-shaped electrodes 42 connected by the first connection part 41 grounded. Likewise, the liquid crystal optical grating 32 is not limited to forming the longitudinal black-and-white barrier in the above-mentioned manner. For example, the preset voltage signal may be applied to the plurality of the fourth stripe-shaped electrodes 49 connected by the fourth connection part 48 on the lower substrate 35 with the plurality of the third stripe-shaped electrodes 47 connected by the third connection part 46 grounded.

Optionally, the planar electrode or the plurality of lower substrate stripe-shaped electrodes 45 on the lower substrate 35 may be grounded, in order to shield itself/themselves from the interference of the noise signal from the liquid crystal display module 31.

Figure 11:
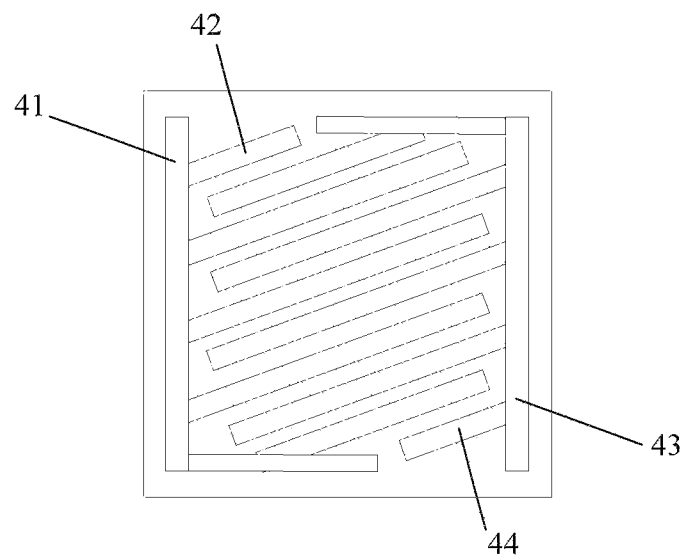
FIG. 11 is a schematic diagram of another arrangement of the upper substrate stripe-shaped electrodes.
Figure 12:
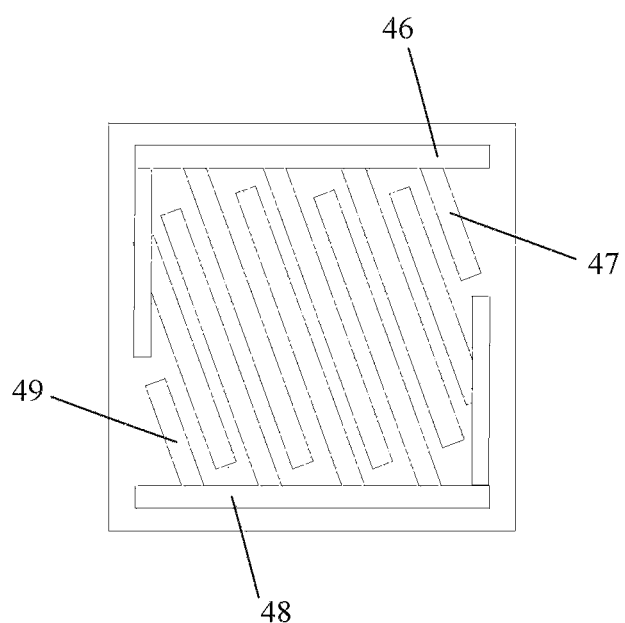
FIG. 12 is a schematic diagram of another arrangement of the lower substrate stripe-shaped electrodes.

Please referring to FIGS. 11 and 12, the plurality of upper substrate stripe-shaped electrodes 37 may be arranged obliquely with respect to a side of the upper substrate, and the plurality of lower substrate stripe-shaped electrodes 45 may also be arranged obliquely with respect to a side of the lower substrate. In this way, a multi-view display function can be implemented for the 3D display apparatus 30. It is to be noted that implementing the multi-view display function by an oblique arrangement of the stripe-shaped electrodes is a well-known technology to the skilled in the art, and will not be discussed here in detail.

Figure 13:
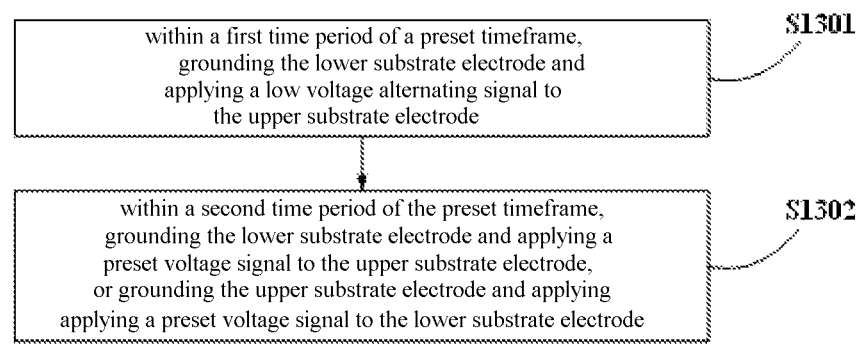
FIG. 13 is a flow chart of a control method for a 3D display apparatus, according to another embodiment of the present disclosure.

Please referring to FIG. 13, according to another embodiment of the disclosure, there is provided a control method for the 3D display apparatus, which may enable the 3D display apparatus to implement a touch screen function and a 3D display function by driving the electrodes on the upper and lower substrates in a time-division manner in a preset timeframe. The method may comprise the steps of:

S1301, within a first time period of a preset timeframe, grounding the lower substrate electrode of the liquid crystal optical grating and applying a low voltage alternating signal to the upper substrate electrode of the liquid crystal optical grating, so as to implement a touch screen function of the 3D display apparatus; and

S1302, within a second time period of the preset timeframe, grounding the lower substrate electrode of the liquid crystal optical grating and applying a preset voltage signal to the upper substrate electrode of the liquid crystal optical grating, or grounding the upper substrate electrode of the liquid crystal optical grating and applying a preset voltage signal to the lower substrate electrode of the liquid crystal optical grating, so as to implement a 3D display function of the 3D display apparatus.

By way of example and not limitation, the preset timeframe may be set by the manufacture in advance, or it may be set by the user in real time. In the embodiment of the disclosure, the preset timeframe may be the duration of one image frame. Additionally, by way of example and not limitation, the first time period and the second time period of the preset timeframe may be equal, or they may be unequal. For example, if the preset timeframe is 0.01 second, the first time period and the second time period may be both 0.005 second, or they may be 0.007 second and 0.003 second, respectively.

In the case that a two-direction (i.e. the lateral direction and the longitudinal direction) 3D display configuration is employed, i.e. where the stripe-shaped electrodes 37 as shown in FIG. 7 is used on the upper substrate 36 of the liquid crystal optical grating 32 and the stripe-shaped electrodes 45 as shown in FIG. 10 is used on the lower substrate 35 of the liquid crystal optical grating 32, at step 1302, applying the preset voltage signal to the upper substrate may comprise applying the preset voltage signal to the plurality of stripe-shaped electrodes on the upper substrate 36 that are connected by one of the first connection part 41 and the second connection part 43, with the plurality of stripe-shaped electrodes that are connected by the other grounded, so as to implement a 3D display function in a first direction; likewise, applying the preset voltage signal to the lower substrate may comprise applying the preset voltage signal to the plurality of stripe-shaped electrodes on the lower substrate 35 that are connected by one of the third connection part 46 and the fourth connection part 48, with the plurality of stripe-shaped electrodes that are connected by the other grounded, so as to implement a 3D display function in a second direction.

Figure 14:
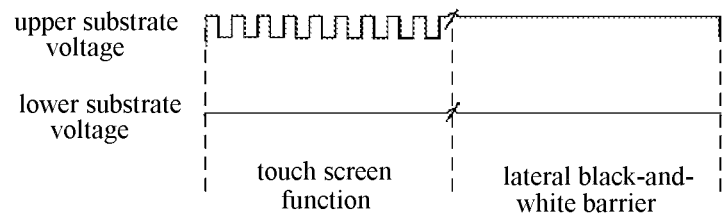
FIG. 14 is a timing diagram of a driving voltage for the upper substrate electrodes and the lower substrate electrodes of the 3D display apparatus according to an embodiment of the present disclosure.
Figure 15:
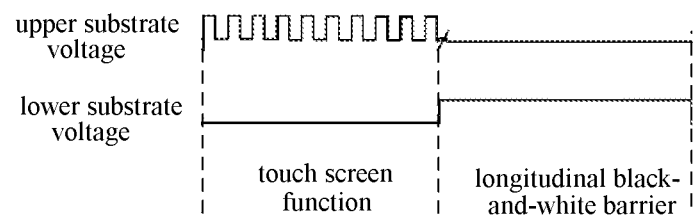
FIG. 15 is a timing diagram of another driving voltage for the upper substrate electrodes and the lower substrate electrodes of the 3D display apparatus according to an embodiment of the present disclosure.

Please referring to FIGS. 14 and 15, the electrodes on the upper and lower substrates of the liquid crystal optical grating may be driven in a time-division manner, where the touch screen function is implemented in the first half of the timeframe and the 3D display function in the latter half. Both the touch screen function and the 3D display function in the lateral direction can be implemented with the configuration of the driving voltages for the upper substrate 36 and the lower substrate 35 as shown in FIG. 14. Both the touch screen function and the 3D display function in the longitudinal direction can be implemented with the configuration of the driving voltages for the upper substrate 36 and the lower substrate 35 as shown in FIG. 15.

While several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations are to be performed in the particular order shown or in a sequential order, or that all illustrated operations are to be performed to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A three dimensional (3D) display apparatus, comprising:
    a liquid crystal optical grating located on a liquid crystal display module, wherein the liquid crystal optical grating is provided with a respective probe terminal on each of the four corners of an electrode layer thereof, for detection of an electric current value, and wherein the liquid crystal optical grating comprises a lower substrate disposed on the liquid crystal display module and an upper substrate disposed oppositely to the lower substrate, the lower substrate being provided with a plurality of lower substrate stripe-shaped electrodes arranged side by side on the surface facing the upper substrate, the upper substrate being provided with a plurality of upper substrate stripe-shaped electrodes arranged side by side on the surface facing the lower substrate, the plurality of upper substrate stripe-shaped electrodes and the plurality of lower substrate stripe-shaped electrodes being arranged perpendicular to each other, the four probe terminals located, respectively, at the four corners of the rectangular outline formed by the plurality of upper substrate stripe-shaped electrodes; and
    a controller signally connected with the four probe terminals, wherein the controller is used for calculation of a touch point position of a touch object on the 3D display apparatus based on the electric current values detected at the four probe terminals,
    wherein the 3D display apparatus is configured to:
    within a first time period of a preset timeframe, implement a touch screen function by grounding the plurality of lower substrate stripe-shaped electrodes and applying an alternating voltage signal to the plurality of upper substrate stripe-shaped electrodes, the alternating voltage signal being used for generating the electric current upon a touch of the touch object on the 3D display apparatus; and
    within a second time period of the preset timeframe, implement 1) a 3D display function in a first direction by grounding the plurality of lower substrate stripe-shaped electrodes and applying a preset voltage signal to a part of the plurality of upper substrate stripe-shaped electrodes, with the remaining part being grounded, or 2) a 3D display function in a second direction by grounding the plurality of upper substrate stripe-shaped electrodes and applying the preset voltage signal to a part of the plurality of lower substrate stripe-shaped electrodes, with the remaining part being grounded.

2. The 3D display apparatus of claim 1, wherein the plurality of upper substrate stripe-shaped electrodes consist of two parts, one of which comprising a plurality of a first stripe-shaped electrode connected by a first connection part, the other of which comprising a plurality of a second stripe-shaped electrode connected by a second connection part, the first stripe-shaped electrodes and the second stripe-shaped electrodes being arranged interlaced with each other.

3. The 3D display apparatus of claim 2, wherein the four probe terminals are located at the both ends of the first connection part and the both ends of the second connection part, respectively.

4. The 3D display apparatus of claim 1, wherein the plurality of lower substrate stripe-shaped electrodes consist of two parts, one of which comprising a plurality of a third stripe-shaped electrode connected by a third connection part, the other of which comprising a plurality of a fourth stripe-shaped electrode connected by a fourth connection part, the third stripe-shaped electrodes and the fourth stripe-shaped electrodes being arranged interlaced with each other.

5. The 3D display apparatus of claim 1, wherein the plurality of lower substrate stripe-shaped electrodes disposed on the lower substrate are configured to be grounded during implementation of a touch screen function of the 3D display apparatus.

6. The 3D display apparatus of claim 4, wherein the plurality of lower substrate stripe-shaped electrodes disposed on the lower substrate are configured to be grounded during implementation of a touch screen function of the 3D display apparatus.

7. The 3D display apparatus of claim 1, wherein the plurality of upper substrate stripe-shaped electrodes are arranged obliquely with respect to a side of the upper substrate, and wherein the plurality of lower substrate stripe-shaped electrodes are arranged obliquely with respect to a side of the lower substrate.

8. The 3D display apparatus of claim 4, wherein the plurality of upper substrate stripe-shaped electrodes are arranged obliquely with respect to a side of the upper substrate, and wherein the plurality of lower substrate stripe-shaped electrodes are arranged obliquely with respect to a side of the lower substrate.

9. The 3D display apparatus of claim 5, wherein the plurality of upper substrate stripe-shaped electrodes are arranged obliquely with respect to a side of the upper substrate, and wherein the plurality of lower substrate stripe-shaped electrodes are arranged obliquely with respect to a side of the lower substrate.

* * * * *